(12) United States Patent
Xu et al.

(10) Patent No.: US 11,860,744 B2
(45) Date of Patent: Jan. 2, 2024

(54) COMMUNICATION NETWORK DATA FAULT DETECTION AND MITIGATION

(71) Applicant: AT&T Intellectual Property I, L.P., Atlanta, GA (US)

(72) Inventors: Ke Xu, Dublin, CA (US); Weihua Ye, Chicago, IL (US); Hyun Ok Lee, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 464 days.

(21) Appl. No.: 17/199,141

(22) Filed: Mar. 11, 2021

(65) Prior Publication Data
US 2022/0292000 A1  Sep. 15, 2022

(51) Int. Cl.
*G06F 11/14* (2006.01)
*G06N 20/00* (2019.01)
*G06F 18/23211* (2023.01)

(52) U.S. Cl.
CPC .... *G06F 11/1469* (2013.01); *G06F 18/23211* (2023.01); *G06N 20/00* (2019.01); *G06F 2201/82* (2013.01)

(58) Field of Classification Search
CPC ............ G06F 11/0751; G06F 11/0709; G06F 11/1469; G06F 11/3006; G06F 11/3409; G06F 11/3447; G06F 18/23211; G06F 2201/82; G06N 20/00
See application file for complete search history.

(56) References Cited

U.S. PATENT DOCUMENTS

| | | | |
|---|---|---|---|
| 10,228,962 B2 | 3/2019 | Doremann et al. | |
| 11,270,800 B1* | 3/2022 | Mitidis | A61B 5/0205 |
| 2012/0209773 A1* | 8/2012 | Ranganathan | G06Q 20/40 705/44 |
| 2017/0076217 A1* | 3/2017 | Krumm | G06N 20/00 |
| 2019/0266070 A1* | 8/2019 | Bhandarkar | G06F 11/3072 |
| 2020/0042388 A1 | 2/2020 | Roberts | |

OTHER PUBLICATIONS

Cisco, Cisco Unified Intelligence Center Report Customization Guide, Release 10.5(1), Feb. 19, 2019, accessed from https://www.cisco.com/c/en/us/td/docs/voice_ip_comm/cust_contact/contact_center/intelligence_suite/intelligence_suite_1051/user/guide/CUIC_BK_CAD76E49_00_unified-intelligence-center-cust-report/CUIC_BK_CAD76E49_00_cisco-unified-intelligence-center-report_chapter_010.html.

(Continued)

*Primary Examiner* — Mansour Oveissi

(57) ABSTRACT

A processing system may apply a binary classifier to detect whether a first data pattern of a first data source associated with a communication network performance indicator is consistent with prior data patterns of the first data source that are labeled as correct data patterns, determine, via the binary classifier, that the first data pattern is not consistent, apply a clustering model to a first input data set comprising the first data pattern and invalid data patterns of the first data source to obtain a first plurality of clusters, verify that the first data pattern is an invalid data pattern when the first plurality of clusters is the same as a second plurality of clusters generated by applying the clustering model to a second input data set comprising the invalid data patterns, and replace the first data source with a replacement data source as an active data source in response.

20 Claims, 9 Drawing Sheets

(56) References Cited

OTHER PUBLICATIONS

Tableau Software, "Connecting to Multiple Data Source Without Joining or Blending", Jan. 3, 2019, accessed from https://kb.tableu.com/articles/howto/connecting-multiple-data-sources-without-joining-or-blending, 3 pages.
Stack Overflow, "Primary/Secondary failover DataSource in Spring Boot", accessed on Jan. 28, 2022 from https://stackoverflow.com/questions/45800582/primary-secondary-failover-datasource-in-spring-boot, 6 pages.
Flussonic Manual, "Source Failover", accessed on Jan. 28, 2022 from https://flussonic.com/doc/live-streaming/source-failover/, 10 pages.

* cited by examiner

FIG. 2

| KPI | Past Failure(s) Before Service(s) | CT_DS (Recovery Op) | Past Recovery Op | CT_Virtual List | Past CT_DS |
|---|---|---|---|---|---|
| KPI_1 | CT_DS_1 [safe] | | CT_DS_3 [safe] | CT_DS_2 [safe] | CT_DS_4, CT_DS_6 |
| KPI_2 | CT_DS_2 [safe] | | CT_DS_3 [safe] | CT_DS_1 [safe] | CT_DS_5 |
| KPI_3 | CT_DS_4 [safe] | | CT_DS_1 [warning] | | CT_DS_4 [faulty] |

| Case 1 | Returned by DNN | DNN Action |
|---|---|---|
| A single data source | P-DS [safe] | Return P-DS [safe] to DSS |
| | P-DS [faulty] | Move P-DS to faulty DS column and alert/report |
| | P-DS [warning] | Return P-DS [warning] to DSS, send P-DS to admin for labeling |

510

| Case 2 | Returned by DNN | DNN Action |
|---|---|---|
| Two data sources | P-DS [safe]; S-DS [safe/faulty/warning] | Return P-DS [safe] to DSS<br>If S-DS [faulty]<br>Move S-DS to faulty DS column and alert/report<br>If S-DS [warning]<br>Send S-DS to admin for labeling |
| | P-DS [faulty]; S-DS [safe/faulty/warning] | Move S-DS to P-DS, return P-DS [safe] to DSS<br>If S-DS [safe]<br>Move S-DS to P-DS, return P-DS [safe] to DSS<br>If S-DS [faulty]<br>Move S-DS to faulty DS column and alert/report<br>If S-DS [warning]<br>Move S-DS to P-DS, return P-DS [warning] to DSS, send S-DS to admin for labeling |
| | P-DS [warning]; S-DS [safe/faulty/warning] | If S-DS [safe]<br>Swap P-DS and S-DS, return P-DS [safe] to DSS, send S-DS to admin for labeling<br>If S-DS [faulty]<br>Move S-DS to faulty DS column and alert/report, return P-DS [warning] to DSS, send P-DS to admin for labeling<br>If S-DS [warning]<br>return P-DS [warning] to DSS, send P-DS and S-DS to admin for labeling |

| Case | Initial Status | Data Action |
|---|---|---|
| More than two data sources | P-DS [safe], S-DS [safe], T-DS [safe] | Return P-DS [safe] to DSS |
| | P-DS [safe], S-DS [safe], T-DS [faulty] | Return P-DS [safe] to DSS<br>Move T-DS to Faulty DS column and alert/report<br>Move one DS from DS Waiting List to T-DS (if any) |
| | P-DS [safe], S-DS [faulty], and T-DS [safe] | Return P-DS [safe] to DSS<br>Move S-DS to Faulty DS column and alert/report<br>Move one DS from DS Waiting List to S-DS (if any) |
| | P-DS [faulty], S-DS [safe] and T-DS [safe] | Move P-DS to Faulty DS column and alert/report<br>Move S-DS to P-DS, and move T-DS to S-DS, and move one DS from DS Waiting List to T-DS (if any)<br>Return P-DS [safe] to DSS |
| | P-DS [safe] or S-DS [safe] or T-DS [safe] (only one can occur) | Move DS [safe] to P-DS (if not P-DS [safe]). Move any DS [faulty] to Faulty DS column and alert/report, send DS [warning] to admin for labeling, return P-DS [safe] to DSS, move DS from DS Waiting List to the position of DS [faulty] (if any) |
| | No safe and warning DS | Move any DS [faulty] to Faulty DS column and alert/report, move DS from DS Waiting List to the position of DS [faulty] (if any) |
| | No safe DS, but at least one warning DS | Move any one DS [warning] to P-DS, send DS [warning] to admin for labeling. Move any DS [faulty] to Faulty DS column and alert/report. Return P-DS [warning] to DSS, move DS from DS Waiting List to the position of DS [faulty] (if any) |

FIG. 6

COMMUNICATION NETWORK DATA FAULT DETECTION AND MITIGATION

The present disclosure relates generally to communication network operations, and more particularly to methods, computer-readable media, and apparatuses for replacing a first data source with a replacement data source as an active data source for communication network monitoring in response to verifying an invalid data pattern of the first data source.

BACKGROUND

Communication networks generate huge volumes of network operational data. For instance, raw data may be first generated by network elements and aggregated by data collection elements. After collection, the data may be transferred to be stored by various data sources, which can be in the form of files or databases stored on physical or virtual servers. The data stored in the data sources may then be accessed by consuming services and applications. For instance, in a self-optimizing network (SON) architecture, a communication network may be configured and/or reconfigured in response to various aspects of the collected data, e.g., as determined by a SON orchestrator, or the like.

SUMMARY

Methods, computer-readable media, and apparatuses for replacing a first data source with a replacement data source as an active data source for communication network monitoring in response to verifying an invalid data pattern of the first data source are described. For instance, in one example, a processing system including at least one processor may apply a binary classifier to detect whether a first data pattern of a first data source, from among a plurality of data sources associated with a performance indicator of a communication network, is consistent with prior data patterns of the first data source that are labeled as correct data patterns from one or more time periods prior to the first data pattern, wherein the binary classifier is trained based upon the prior data patterns, wherein the first data source comprises an active data source. The processing system may next determine, via the binary classifier, that the first data pattern is not consistent with the prior data patterns of the first data source that are labeled as correct data patterns, apply a clustering model to a first input data set comprising the first data pattern and a plurality of invalid data patterns of the first data source to obtain a first plurality of clusters, and verify that the first data pattern is an invalid data pattern for the first data source when the first plurality of clusters is the same as a second plurality of clusters, the second plurality of clusters generated by applying the clustering model to a second input data set comprising the plurality of invalid data patterns. The processing system may then replace the first data source with a replacement data source as an active data source from among the plurality of data sources in response to the verifying that the first data pattern is an invalid data pattern for the first data source.

BRIEF DESCRIPTION OF THE DRAWINGS

The teachings of the present disclosure can be readily understood by considering the following detailed description in conjunction with the accompanying drawings, in which:

FIG. 2 illustrates an example architecture for network data collection and consumption in a telecommunication network, in accordance with the present disclosure;

FIG. 4 illustrates an example schema of a redundancy and mediation table, in accordance with the present disclosure;

FIG. 5 illustrates example action tables for a data source mediator, in accordance with the present disclosure;

FIG. 6 illustrates an additional example action table for a data source mediator, in accordance with the present disclosure;

To facilitate understanding, identical reference numerals have been used, where possible, to designate identical elements that are common to the figures.

DETAILED DESCRIPTION

Figure 1:
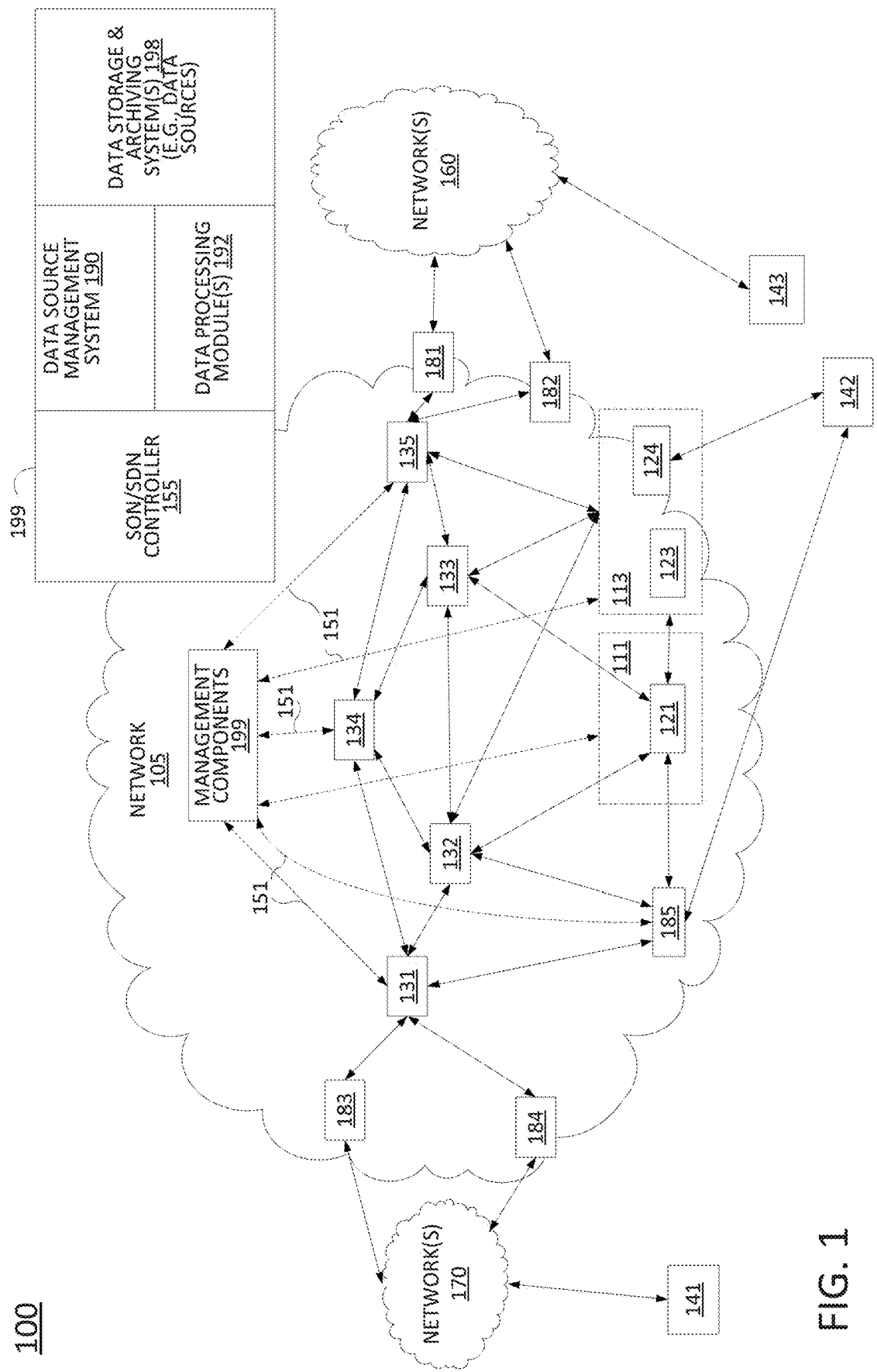
FIG. 1 illustrates an example system related to the present disclosure.

The present disclosure describes methods, computer-readable media, and apparatuses for replacing a first data source with a replacement data source as an active data source for communication network monitoring in response to verifying an invalid data pattern of the first data source. In particular, examples of the present disclosure provide communication network data integrity validation for developing and operating data analytics and data-powered services for network management and configuration. For instance, examples of the present disclosure provide a machine learning-based data source fault detection and mitigation system for data applications and services. In one example, the present disclosure includes a data integrity system, between data sources and a data processing layer for closed-loop operation. In addition, in one example, the data integrity system, e.g., a data source management system, may provide a three-stage machine learning-based approach that identifies and learns new patterns of faults. The data source management system may include modularized components and is extensible to support multiple applications and different operation modes, e.g., proactive or reactive.

In one example, an end-to-end network data processing workflow may include multiple layers. For instance, raw network operational data may be first generated in a network elements layer. Network elements are logical network entities comprising one or more physical devices, e.g., eNodeBs, mobility management entities (MMEs), etc. Data collection elements in a next layer may be responsible for collecting raw data from network elements and may comprise, for example, OSS-RC (operations support system-radio and core), network element vendor-specific management applications, or third-party management applications. After collection, the data may be transferred to be stored as data sources, which may be referred to as a data sources layer. The data stored in the data sources may be in the form of files or databases stored on physical or virtual servers. The data sources can include end-to-end Transport Control Protocol (TCP) data, radio access network (RAN) data, Internet Protocol (IP) transport data, and so forth. Next, the data stored in data sources may be retrieved and processed in the data processing layer, and eventually consumed by upper-layer services and applications.

In accordance with the present disclosure, a data integrity layer, e.g., a data integrity system, operates between the data sources layer and the data processing layer. For instance, the present disclosure recognizes that invalid data may be caused by problematic raw data, errors introduced during data pre-processing and manipulation performed in data sources, e.g., aggregation across time, data storing, network issues, data loss due to physical emergency such as power outage, and so on. In the absence of the present disclosure, invalid data is often still processed and consumed by services and applications, potentially leading to unusual or abnormal data or network behaviors observed and/or reported by network personnel or end-users. In particular, data integrity is not checked and validated before data is further processed and used. This may result in poor user experiences, inaccurate results, potentially missed faults, belated alerts or reporting, and protracted issue resolution.

Examples of the present disclosure provide several advantages, including a closed-loop data validity check for fault detection, fault mitigation, and reporting that is accurate and timely. Examples of the present disclosure are also scalable by employing a separate data integrity layer and modularized components, which in turn may support more applications and services in the upper layer. In addition, the present disclosure provides an improvement over detection or check mechanisms placed within the services and applications layer. For instance, results computed from invalid data could in some cases show abnormity, which may be detected by an end-user or a detection mechanism. However, there is a risk of missing potential faults hidden in calculated results and there may be delays in alerting and reporting of issues, which may be avoided by the present examples. Moreover, examples of the present disclosure are also extensible by using an expandable data pattern table that is able to keep track of recognized correct and faulty data patterns. For instance, this data pattern table may be consumed or expanded by an external data analytics module or a software defined network (SDN) controller in an SDN environment.

To illustrate, closed-loop network monitoring and optimization may be deployed for existing Uniform Mobile Telecommunications System (UMTS) and Long Term Evolution (LTE) networks, e.g., in the form of SON (self-optimizing networks), which may operate concurrently as an SDN/network function virtualization (NFV)-based network architecture. In addition, user equipment (UE)/app-level control capabilities are increasingly being made available for (4G) and (5G) networks. Closed-loop control capabilities in the RAN framework, where real-time data is ingested and used to improve user experience and optimize network performance and capacity, are thus improved by the data source management system of the present disclosure. For instance, in one example, a quality of experience (QoE)-based video traffic steering application improves video user experience by intelligently steering traffic among multiple cells via a closed-loop UE-level performance monitoring and control. By ensuring valid underlying data is consumed by the control system, e.g., an SON orchestrator and/or an SDN controller or the like, the accuracy and hence the QoE of the user-consumed videos may be improved via examples of the present disclosure.

Similarly, in the area of SON, the present disclosure may provide cell-level parameter optimization that controls load balancing among neighbor cells such that certain QoE requirements are met for a set of users or overall network utilization is more balanced. In such closed-loop control examples, accuracy is improved via automatic detection and mitigation of data faults so that incorrect and/or unreliable data are not used for control decisions. The present disclosure also provides a federated, reliable, and highly secure system for sharing data across entities to solve complex analytical problems. For example, once any fault or invalid data is detected before being consumed by applications and services, the alerting or reporting is triggered by the present data source management system. For instance, corresponding entities with data access privileges may be notified of detailed information and reports. With such an automatic and accurate approach, irrelevant entities or entities without privileges in the middle of customers and data source owners are excluded, enhancing the security in the environment. A further benefit is a shortening of trace-back cycles compared to observing issues from upper layers. Moreover, in accordance with the present disclosure, any data faults are transparent to customers insofar as faulty data sources are replaced by reliable alternative data sources with regard to one or more performance indicators of interest. These and other aspects of the present disclosure are discussed in greater detail below in connection with the examples of FIGS. 1-9.

To aid in understanding the present disclosure, FIG. 1 illustrates a block diagram depicting one example of a communications network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, a 5G core network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) and/or containers comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data units, bursts, and so forth. The particular terminology or types of data units involved may vary depending upon the underlying network technology. Thus, the term "traffic" is intended to refer to any quantity of data to be sent from a source to a destination through one or more networks. It should also be noted that the term "packet" may also be used to refer to any of a segment, a datagram, a frame, a cell, a PDU, a service data unit, a burst, and so forth, such as an IP packet.

In one example, the network 105 may be in communication with networks 160 and networks 170. Networks 160 and 170 may each comprise a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one particular example, networks 160 and 170 may comprise 5G radio access networks. For example, as illustrated in FIG. 1, the system 100 may represent a "non-stand alone" (NSA) mode architecture where 5G radio access network components, such as a "new radio" (NR), "gNodeB" (or "gNB"), and so forth are supported by a 4G/LTE core network (e.g., where network 105 represents an Evolved Packet Core (EPC) network). However, in another example, system 100 may instead comprise a 5G "standalone" (SA) mode point-to-point or service-based architecture where EPC components and functions of network 105 are replaced by a 5G core network, which may include an access and mobility management function (AMF), a user plane function (UPF), a session management function (SMF), a policy control function (PCF), a unified data management function (UDM), an authentication server function (AUSF), an application function (AF), a network repository function (NRF), and so on. In addition, these various components may comprise VNFs, as described herein.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. User devices 141-143 may comprise, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, user devices 141-143 may communicate with or may communicate via network 105 in various ways. For example, user device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth.

In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. As noted above, these various virtual network functions may be container-based VNFs and/or VM-based VNFs. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

As further illustrated in FIG. 1, network 105 includes management components 199, which may include data source management system 190 (including several components as described in greater detail below), one or more data processing modules 192, one or more data storage and archiving systems 198, a self-optimizing network (SON)/software defined network (SDN) controller 155. In one example, each of the management components 199 or the management components 199 collectively may comprise a computing system or server, such as computing system 900 depicted in FIG. 9, or a processing system comprising multiple computing systems and/or servers, and may be configured to provide one or more operations or functions for replacing a first data source with a replacement data source as an active data source for communication network monitoring in response to verifying an invalid data pattern of the first data source.

Figure 9:
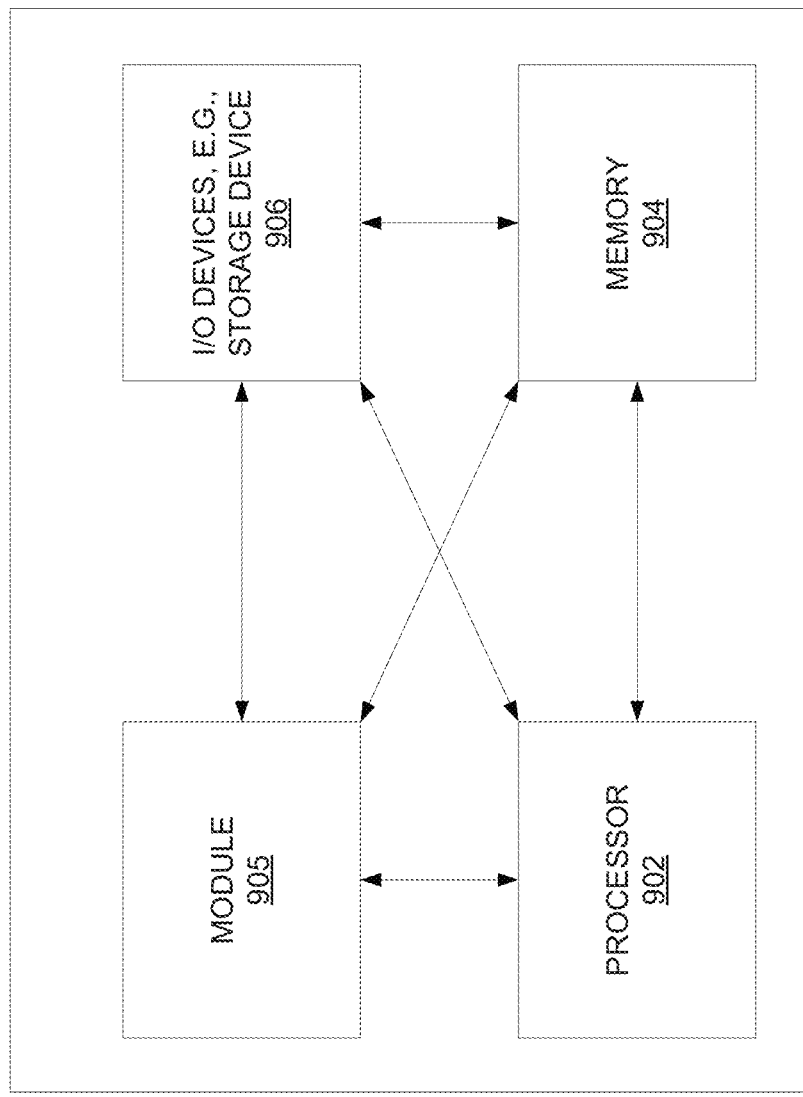
FIG. 9 illustrates a high level block diagram of a computing device specifically programmed to perform the steps, functions, blocks and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 9 and discussed below) or multiple computing devices collectively configured to perform various steps, functions, and/or operations in accordance with the present disclosure.

In one example, NFVI 111 and unit 121, and NFVI 113 and units 123 and 124 may be controlled and managed by the SON/SDN controller 155. For instance, in one example, SON/SDN controller 155 is responsible for such functions as provisioning and releasing instantiations of VNFs to perform the functions of routers, switches, and other devices, provisioning routing tables and other operating parameters for the VNFs, and so forth. In one example, SON/SDN controller 155 may maintain communications with VNFs and/or host devices/NFVI via a number of control links 151 which may comprise secure tunnels for signaling communications over an underling IP infrastructure of network 105. In other words, the control links 151 may comprise virtual links multiplexed with transmission traffic and other data traversing network 105 and carried over a shared set of physical links. For ease of illustration control links associated with some of the components of network 105 are omitted from FIG. 1. In one example, the SON/SDN controller 155 may also comprise a virtual machine operating on NFVI/host device(s), or may comprise a dedicated device. For instance, SON/SDN controller 155 may be collocated with one or more VNFs, or may be deployed in a different host device or at a different physical location.

The functions of SON/SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SON/SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SON/SDN controller 155 may instruct the NFVI 113 to load the configuration code previously stored on NFVI 113 and/or to retrieve the configuration code from another device in network 105 that may store the configuration code for one or more VNFs. The functions of SON/SDN controller 155 may also include releasing or decommissioning unit 123 and/or unit 124 when no longer required, the transferring of the functions of units 123 and/or 124 to different NFVI, e.g., when NVFI 113 is taken offline, and so on.

In addition, in one example, SON/SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

In one example, SON/SDN controller 155 may function as a self-optimizing network (SON) orchestrator that is responsible for activating and deactivating, allocating and deallocating, and otherwise managing a variety of network components. For instance, SON/SDN controller 155 may set and adjust configuration parameters for various routers, switches, firewalls, gateways, and so forth. In one example, one or more of networks 160 or networks 170 may comprise cellular access networks, and SON/SDN controller 155 may activate and deactivate antennas/remote radio heads, may steer antennas/remote radio heads, may allocate or deallocate (or activate or deactivate) baseband units in a baseband unit (BBU) pool, may add (or remove) one or more network slices, may set and adjust various configuration parameters for carriers in operation at the various cell sites, and may perform other operations for adjusting configurations of cellular access network components in accordance with the present disclosure.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SON/SDN controller 155 via additional control links. However, at least a portion of the internal nodes 131-135 may comprise dedicated devices or components, e.g., non-SDN reconfigurable devices.

Similarly, network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

In one example, various components of network 105 and/or the system 100 may be configured to collect, enhance, and forward network operational data, e.g., to one or more of data storage and archiving systems 198. In one example, the network operational data may include raw packets that may be copied from various routers, gateways, firewalls, or other components in the network 105 (e.g., nodes 131-135, units 121, 123, 124, etc.). In one example, the network operational data may comprise traffic flow data that includes information derived from the raw packets of various flows, such as packet header data (e.g., 5-tuple information, such as source IP address, destination IP address, source port, destination portion, and transport layer protocol), packet size, packet arrival time, and so forth. In one example, the traffic flow data may be aggregated over a plurality of packets of a flow, or multiple flows.

With respect to packet-level sampling, various first-level sampling components of system 100, such as routers, gateways, firewalls, etc., may be configured to sample various packets at a particular packet sampling rate (or different packet sampling rates), and may forward either the sampled packets, or information regarding the sampled packets to one or more collectors (e.g., "data collection elements"). For instance, each of components 181-184 may be first-level (e.g., "first layer") sampling components that may forward packets or information regarding packets to units 121 and 123, comprising collectors. For instance, components 181 and 182 may forward to unit 123, while components 183 and 184 may forward to unit 121. In one example, the sampled packets or information regarding sampled packets may be organized by flow. For instance, sampled packets and/or information regarding sampled packets may be gathered and forwarded to collectors every one minute, every five minutes, etc. In one example, one or more of components 181-184 may forward information regarding all packets handled by the respective component, while the collector(s) (e.g., units 121 and 123) may then perform packet-level sampling by sampling from among the information regarding all of the packets. In one example, units 121 and 123 may forward sampled packets, or information regarding the sampled packets to data storage and archiving system(s) 198. In one example, units 121 and 123 may perform flow-level sampling before forwarding information regarding the sampled packets to data storage and archiving system 198. In any case, the particular configuration(s) of the first level sampling components 181-184 and the collector(s) (e.g., units 121 and 123) may be under the command of SON/SDN controller 155.

The data storage and archiving systems 198 may comprise data repositories of various types of data of the system 100, such as end-to-end Transport Control Protocol (TCP) data, radio access network (RAN) data, Internet Protocol (IP) traffic data (e.g., packet and/or flow-level data such as discussed above), SDN status data (e.g., NFVI statuses and performance data, VM and/or VNF statuses and performance data), user equipment (UE) status data, usage data, etc., and so forth. For instance, one of the data storage and archiving systems 198 may obtain information regarding sampled packets for various flows. In one example, the collector(s) (e.g., units 121 and 123) may have already performed flow-level sampling. In another example, one of the data storage and archiving systems 198 may initially obtain information regarding packets for all flows that are observed within the relevant portion of system 100. The one of data storage and archiving systems 198 may organize the information regarding the sampled packets into a flow record. For instance, information regarding sampled packets may be organized by flow at the units 121 and 123 and forwarded to data storage and archiving systems 198 as one-minute records, 5-minute records, etc. The one of the data storage and archiving systems 198 may then aggregate these records over an entire flow into a flow record. In one example, a flow may be considered ended when there are no new packets observed for a particular flow for a particular duration of time, e.g., no new packets for the flow (e.g., identified by a 5-tuple, or the like) within a five minute interval, a ten minute interval, etc. In one example, the first-level sampling components, the collector(s), and the one of the data storage and archiving systems 198 may comprise a data distribution and/or stream processing platform, such as instances of Apache Kafka, Apache Pulsar, or the like. In one example, data storage and archiving systems 198 may represent one or more distributed file systems, e.g., a Hadoop® Distributed File System (HDFS™), or the like.

Although the foregoing is described primary with respect to Internet Protocol (IP) traffic data (e.g., packet and/or flow-level data such as discussed above), it should be understood that various network elements, such as routers, gateways, firewalls, NFVI, etc., VMs and/or VNFs, RAN components, such as base station equipment, cellular core network components, and so forth, may generate network operational data with regard to such components' own performances and statuses (e.g., processor utilization, memory utilization, temperature, throughput, packet loss ratio, packet delay, moving averages or weighted moving averages of any of the preceding examples, and so on). Similar to the foregoing example, these components may also forward such network operational data in raw, sampled, or aggregate form to collectors (e.g., units 121 and 123, also referred to herein as "data collection elements"), which may further forward such data in raw, sampled, or aggregate form to one or more of data storage and archiving systems 198 (e.g., "data sources" in a "data sources layer" as referred to herein). In one example, the collectors may comprise vendor specific monitoring equipment, e.g., to specifically collect network operational data from network elements manufactured by such vendor(s) an OSS-RC, open-source or proprietary third party management applications, network operator provided data collection system(s), and so on.

In accordance with the present disclosure, data source management system 190 may operate between data storage and archiving system(s) 198 (e.g., "data sources" or a "data source layer") and one or more data consumers, e.g., a "data processing layer" comprising data processing module(s) 192 and/or data consuming applications or services (such as SON/SDN controller 155). For instance, a data consumer may comprise one of the data processing modules 192 for generating a performance indicator regarding a percentage of video traffic in encrypted traffic in a portion of network 105. To illustrate, the module may apply a machine learning algorithm (MLA) that analyzes a portion of traffic data and determines whether the portion contains video data (e.g., a binary classifier) and/or determines a category of the encrypted traffic within the portion from among a plurality of possible categories (e.g., video streaming, audio streaming, gaming, email, Voice over IP (VoIP), video call, web browsing, etc.). Thus, the module may obtain relevant traffic data from one or more of the data storage and archiving systems 198. In the absence of the present data source management system 190, the one of the data processing modules 192 may obtain the data directly from the one or more of the data storage and archiving systems 198. However, in accordance with the present example, data requests, such as from the one of the data processing modules 192 for determining a percentage of video traffic, may be handled by data source management system 190 which may verify the integrity of data from one or more data sources, e.g., the one or more of the data storage and archiving systems 198. In this regard, it should be noted that data storage and archiving systems 198 may include multiple data sources with the same data, or alternate data that is also useable with respect to the same performance indicator of interest. As such, data source management system 190 may maintain, for each performance indicator, a list of available data sources, the statuses of such data sources (e.g., "safe," "warning," or "faulty") and the designations of such data sources (e.g., in one example, "primary," "secondary," "tertiary," "standby" or "waiting list," and "faulty"). Accordingly, data source management system 190 may provide the requesting data consumers, such as the one of the data processing modules 192 for determining a percentage of video traffic, with identifications of "safe" data sources, identifications of data sources with a "warning" status, and so on.

The data source management system 190 is illustrated and described at a high-level in connection with the example of FIG. 1. For instance, modules or components of the data source management system 190, and so forth are omitted from illustration in FIG. 1. Thus, these and other aspects of data source management system 190 are described in greater detail below in connection with the examples of FIGS. 2-8. It should also be noted that while various data within the data storage and archiving systems 198 may be considered as "performance indicators," the data stored in these "data sources" may be referred to herein as "network operational data," whereas the outputs of data processing module(s) 192 may be referred to herein as "performance indicators" or "key performance indicators," which may be calculated from the network operational data, e.g., obtained from data sources that have been verified and provided to the data processing module(s) 192 via the data source management system 190.

It should also be noted that in one example, various applications/services, such as SON/SDN controller 155, network monitoring and alerting systems, user devices of network personnel, and so forth may also obtain results of the data processing layer. As just one example, SON/SDN controller 155 may obtain the results of data processing by one of data processing modules 192 that is tasked with determining a percentage of video traffic in a portion of network 105. SON/SDN controller 155 may similarly obtain the results of data processing by various other data processing modules 192 of a data processing layer, such as metrics of utilization level of RAN equipment at one or more cell sites, a demand prediction for a content distribution network (CDN) node, etc. In response, SON/SDN controller 155 may configure/reconfigure aspects of the system 100 based on the performance indicators from the data processing layer, such as re-routing at least a portion of the traffic in a selected portion of the system 100, load-balancing at least a portion of the traffic in the selected portion of the system 100, offloading at least a portion of the traffic in the selected portion of the system 100, applying a denial-of-service mitigation measure in the selected portion of the system 100, and so forth. For instance, if a percentage of video traffic in a portion of network 105 exceeds a threshold, SON/SDN controller 155 may offload a portion of the video traffic or other traffic by instantiating one or more new VMs/VMFs (e.g., a new CDN edge node), or the like. For example, if the percentage of video traffic exceeds a threshold, the quality of experience (QoE) of users of other types of traffic may degrade. Alternatively, or in addition, the QoE experienced by end users of various video streams may also suffer if left unaddressed.

In each example, the adjusting may include allocating at least one additional resource of the system 100 based upon the performance indicator(s) and/or removing at least one existing resource of the communication network based upon the performance indicator(s), such as adding or removing a VM/VNF at NFVI 111. In one example, the processing system may reconfigure at least one allocated resource of the communication network differently based upon the at least one aggregate statistic that is determined, i.e., without having to allocate a new resource of the communication network. An additional resource that may be added or an existing resource that may be removed (e.g., deactivated and/or deallocated) or reconfigured may be a hardware component of the network, e.g., a baseband unit, a remote radio head, NFVI, such as NFVI 111 and 113, etc., or may be provided by hardware, e.g., bandwidth on a link, line card, router, switch, or other processing nodes, a CDN storage resource, a VM and/or a VNF, etc.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. In still another example, SON/SDN controller 155, all or some of the components of data source management system 190, and/or other network elements may comprise functions that are spread across several devices that operate collectively as a SDN controller, a data distribution platform, a stream processing system, a data storage system, etc. Thus, these and other modifications of the system 100 are all contemplated within the scope of the present disclosure.

Figure 2:
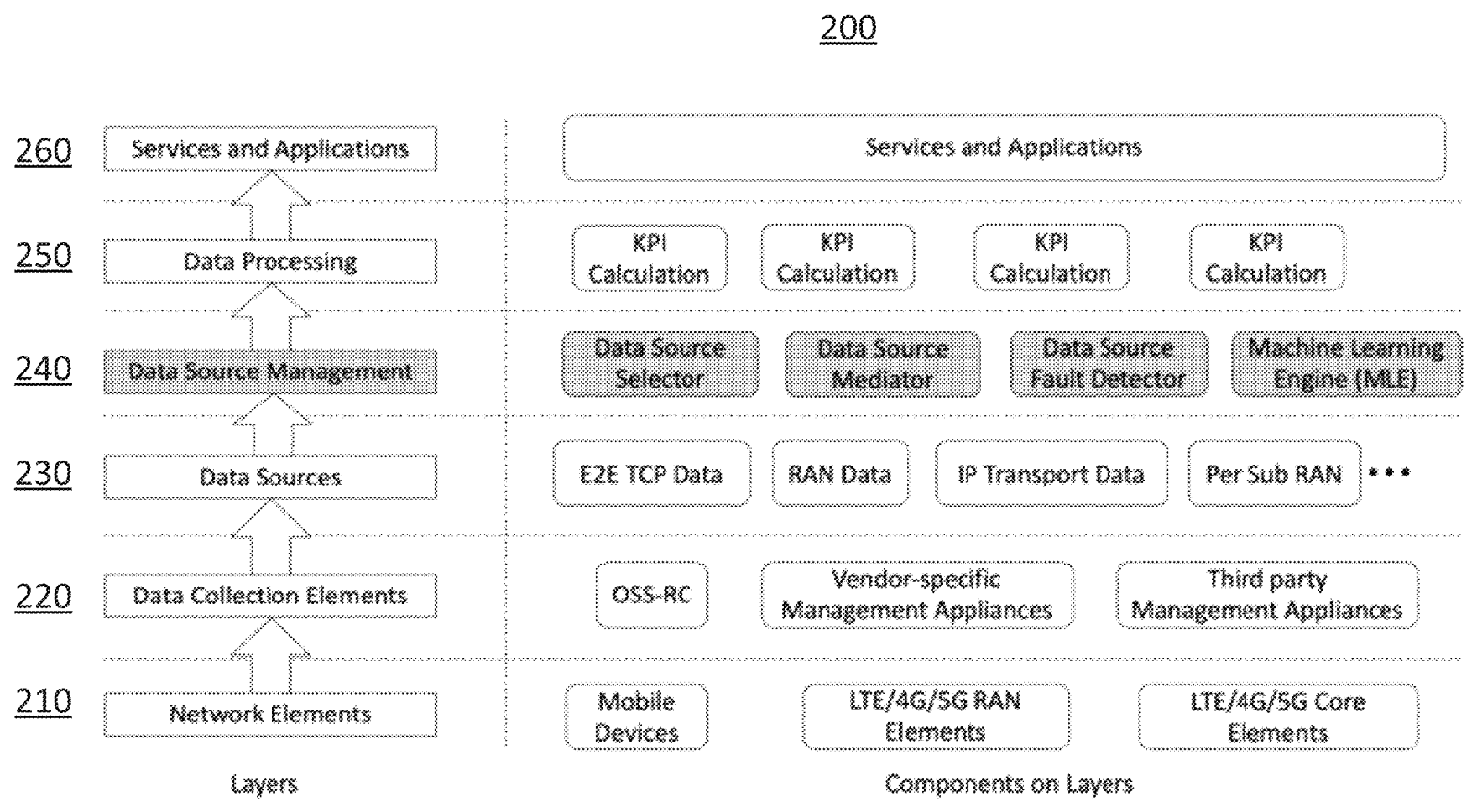

FIG. 2 illustrates an example architecture 200 for network data collection and consumption in a telecommunication network comprising multiple layers 210-260. For instance, raw network operational data may be first generated in a network elements layer 210. Network elements are physical network entities or logical network entities operating on one or more physical devices, e.g., eNodeBs, mobility management entities (MMEs), etc. Data collection elements in a next layer 220 may be responsible for collecting raw data from network elements and may comprise, for example, OSS-RC, network element vendor-specific management applications, or third-party management applications. After collection, the data may be transferred to be stored as data sources, which may be referred to as a data sources layer 230. The data stored in the data sources may be in the form of files or databases stored on physical or virtual servers. The data sources can include end-to-end Transport Control Protocol (TCP) data, radio access network (RAN) data, Internet Protocol (IP) transport data, and so forth.

In accordance with the present disclosure, a data integrity layer 240, e.g., a data source management system, operates between the data sources layer 230 and a data processing layer 250. For instance, the data stored in data sources may be retrieved and processed in the data processing layer 250 (e.g., as directed by the data source management system of the data integrity layer 240), and eventually consumed by upper-layer services and applications in layer 260. Further details of an example data source management system of the data integrity layer 240 are illustrated in FIG. 3 and described in greater detail below.

Figure 3:
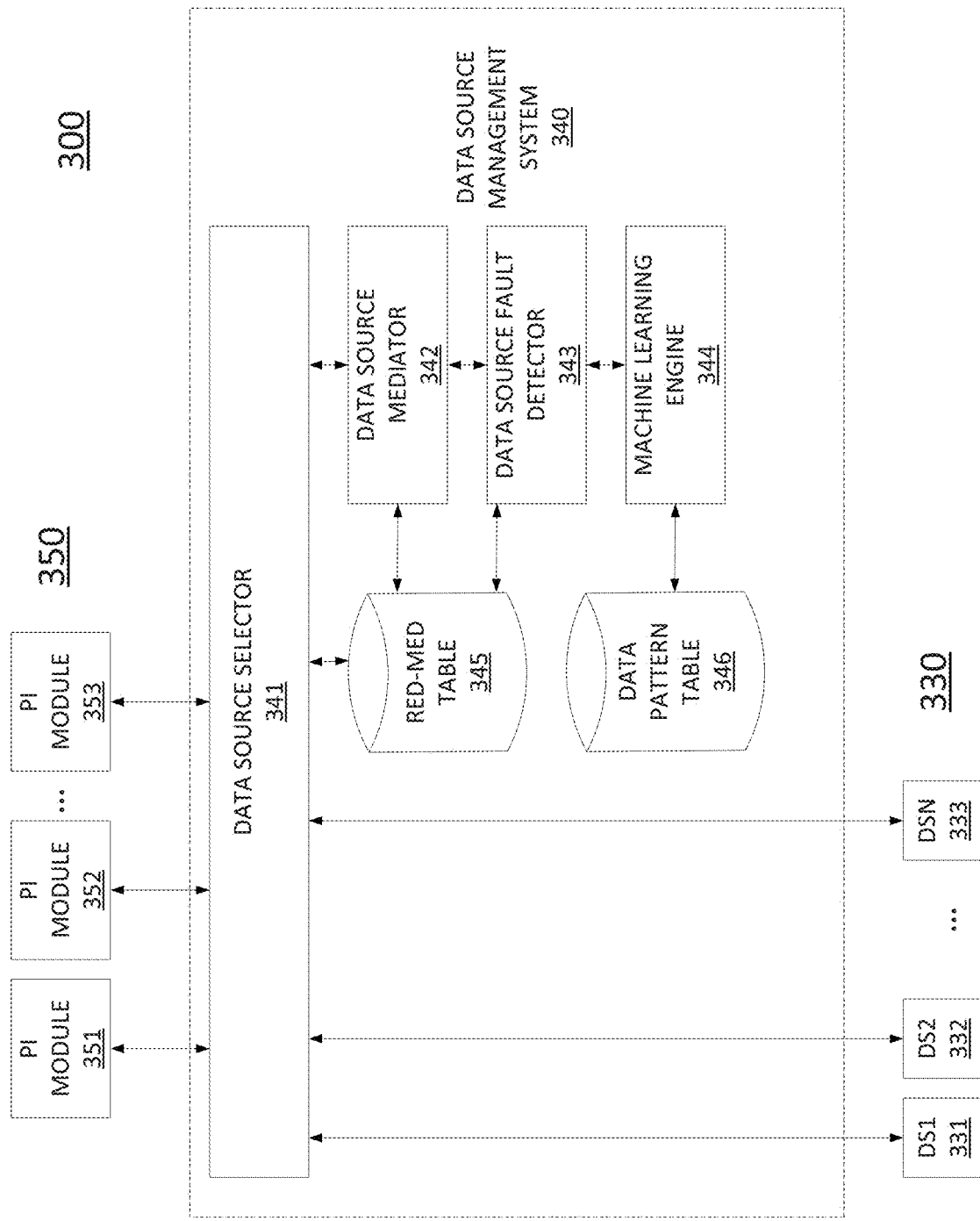
FIG. 3 illustrates an example data source management system, in accordance with the present disclosure.

FIG. 3 illustrates an example data source management system 340 within an example architecture 300 for network data collection and consumption in a telecommunication network. For instance, as shown in FIG. 3, the data source management system 340 sits between a data sources layer 330, having data sources (DSs) 331-333, and a data processing layer 350, having performance indicator (PI) modules 351-353. The data sources layer 330 and data processing layer 350 may be the same as or similar to the counterparts of FIG. 2. In the present example, the data source management system 340 may comprise four primary modules: a data source selector (DSS) 341, a data source mediator (DSM) 342, a data source fault detector (DSFD) 343, and a machine learning engine (MLE) 344. Collectively, the data source management system 340 determines and detects invalid data from the data sources layer 330 automatically and manages invalid data for the data processing layer 350. A redundancy and mediation table (red-med table 345) may maintain data source (DS) metric information that may be used by data source selector (DSS) 341, data source mediator (DSM) 342, and data source fault detector (DSFD) 343. The information in the red-med table 345 may include, for each specified performance indicator (PI), e.g., ("key performance indicators" (KPIs)): all alternative data sources, and/or ordered data sources (e.g., primary, secondary, tertiary, waiting list, and faulty data sources). For each specified performance indicator, each data source is flagged to indicate a level of correctness: [safe] 100% valid, [faulty] contains faults, and [warning] validity not guaranteed, may contain faults. A data source with the level of [safe] may be permitted to be consumed by applications, but the level [faulty] triggers fault alerting and reporting. An example schema in the red-med table 345 is shown in table 400 of FIG. 4. For instance, each performance indicator (PI) (e.g., KPI_1 to KPI_3) may have an entry/row in the table 400. The columns indicate for each performance indicator, a primary data source (P-DS), a secondary data source (S-DS), a tertiary data source (T-DS) (if any), and a data source waiting list containing zero, one, or multiple data sources that are available with regard to the performance indicator, but are not currently in active use. Lastly, a faulty data source column contains any data sources available with regard to a performance indicator that have known [faulty] statuses. In addition, it should be noted that the other four columns may also contain, for each data source, a status of the data source (e.g., [safe], [warning], or [faulty]).

In one example data source selector (DSS) 341 is responsible for obtaining requests from performance indicator modules 351-353 in the data processing layer 350. The requests may be passed to the data source mediator (DSM) 342 that works with the data source fault detector (DSFD) 343 to select the best data source(s) for each request. For instance, the DSS 341 may pull data from one of data sources 331-333 for data source mediator (DSM) 342 to construct an input dataset for checking the validity of the respective data source. In one example, data source selector (DSS) 341 may also obtain and provide data from one or more selected data sources to a requesting PI module. However, in another example, the requesting PI module from the data processing layer 350 may specify whether to ask data source selector (DSS) 341 to pull and return data from the data sources, or to be directed to the appropriate data source(s) by the data source selection 341 after data source verification by the data source mediator (DSM) 342 in conjunction with the data source fault detector (DSFD) 343. To illustrate, data source mediator (DSM) 342 may be responsible for initializing the red-med table 345 (e.g., based on data processing efficiency, user preference, etc.) and may work with data source fault detector (DSFD) 343 to determine data source ordering in the red-med table 345 for each performance indicator of interest. The data source mediator (DSM) 342 may also notify data source selector (DSS) 341 of the selected data source(s) (e.g., primary data source, secondary data source, etc.) with flag(s) for the data source(s) for each request from the modules of data processing layer 350. In one example, the data source mediator (DSM) 342 may also pass input datasets from the data source selector (DSS) 341 to the data source fault detector (DSFD) 343 for checking validity.

Depending on the number of available data sources for a given data request, the actions data source mediator (DSM) 342 will utilize the determinations from data source fault detector (DSFD) 343 of the statuses of different data sources. For instance, example DSM action tables 510, 520, and 600 for different cases are shown in FIGS. 5 and 6. To illustrate, for a single data source that is available with respect to a performance indicator (PI) (e.g., in reference to table 510 of FIG. 5), the data source fault detector (DSFD) 343 may return a status of [safe], [warning], or [faulty] depending upon the results of the machine learning fault detection applied by data source fault detector (DSFD) 343 via machine learning engine 344. For the case of [warning], the data source may be used at the discretion of the requesting PI module, with the understanding that the result(s) may not be accurate. In an example where there are two data sources (e.g., in reference to table 520 of FIG. 5), a [faulty] or [warning] determination with regard to a primary data source may result in a secondary data source becoming the primary data source and the primary data source being moved to a "secondary" designation with a flag of [warning], or to a "faulty" designation. Other changes to the statuses and/or designations of the data sources depending upon the outcomes from the machine learning fault detection applied by data source fault detector (DSFD) 343 via machine learning engine 344 are shown in the table 520.

Similarly, with more than two available data sources (e.g., with reference to table 600 of FIG. 6), the designations of different data sources may be changed depending upon the outcomes from the machine learning fault detection applied by data source fault detector (DSFD) 343 via machine learning engine 344. In general, primary, secondary, or tertiary data sources that are determined to be [faulty] or [warning] may be replaced by another data source that is non-faulty. For instance, when a primary or secondary data source is determined to have a [warning] status and there are no available data sources that have a [safe] status, the data source may remain at a current designation with a flag of [warning] returned to data source selector (DSS) 341 to provide to the requesting module. Other changes to the statuses and/or designations of the data sources depending upon the outcomes from the machine learning fault detection applied by data source fault detector (DSFD) 343 via machine learning engine (MLE) 344 are shown in the table 600. Lastly, data source fault detector (DSFD) 343 is responsible for checking validity of a specific data source requested by data source mediator (DSM) 342 by running a validity check via machine learning engine (MLE) 344 and replying with one of the three states: [safe], [warning], or [faulty].

Figure 7:
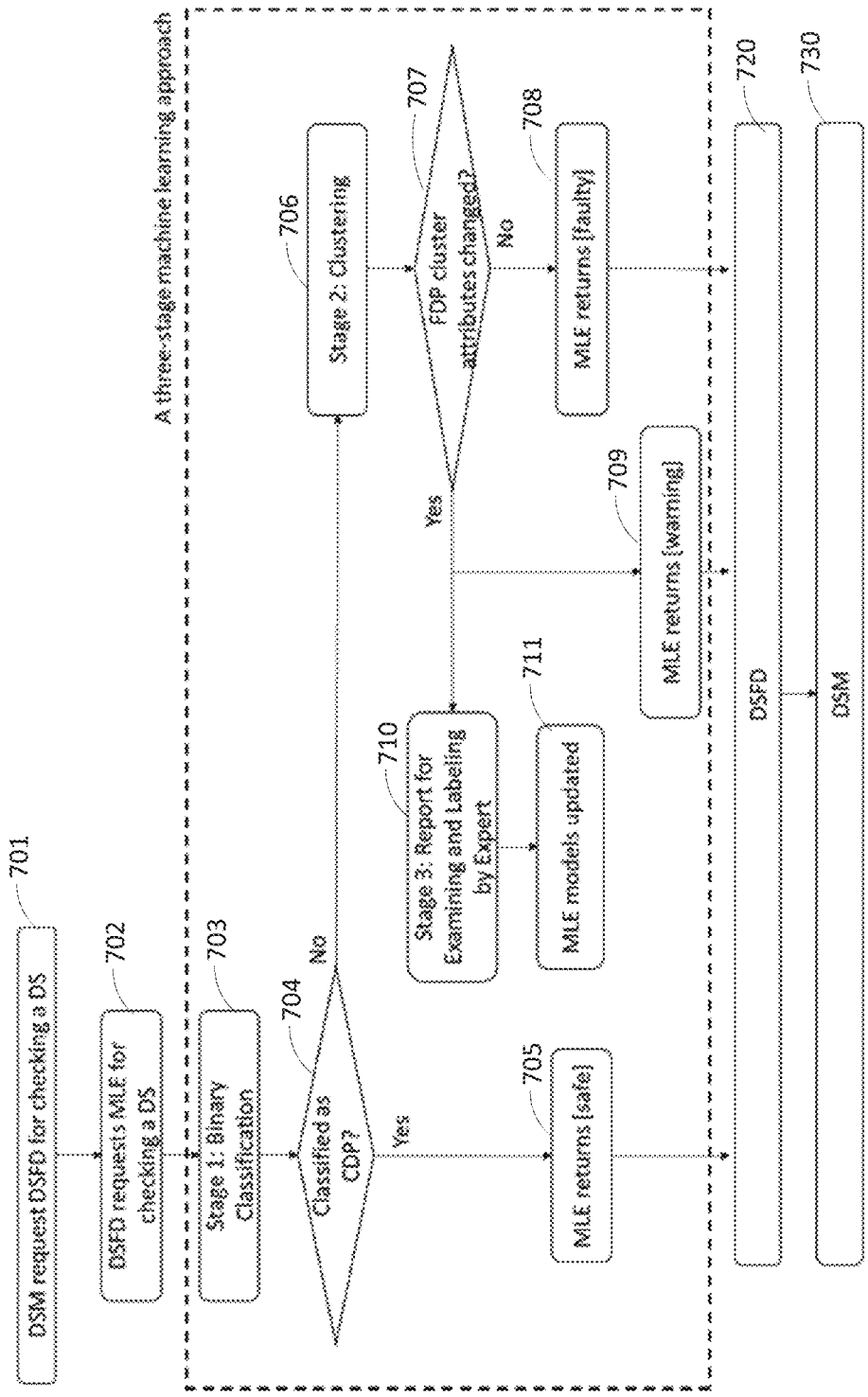
FIG. 7 illustrates a flowchart for an example data source validity check, in accordance with the present disclosure.

An example flowchart 700 for a data source validity check via machine learning engine (MLE) 344 and data pattern table 346 is illustrated in FIG. 7. In one embodiment, the objective of machine learning engine (MLE) 344 is to classify the data set contained in a request received from data source fault detector (DSFD) 343 into one of three possible categories: (1) correct data pattern (CDP), (2) faulty data pattern (FDP), or (3) unknown data pattern (UDP). Before machine learning engine (MLE) 344 starts to classify the data from a request, there may be preprocessing steps to create and update the machine learning (ML)/artificial intelligence (AI) models used. For instance, a training data set may be labeled based on a set of criteria for validity. This set of validity criteria may be determined based on domain knowledge of each KPI from each data source of interest. This set of validity criteria is regularly updated as the data source management system 340 of FIG. 3 processes more data and more data patterns are discovered. To illustrate, in one example, a training data set may be labeled into two groups: "correct data pattern" (CDP) and "faulty data pattern" (FDP). In one example, machine learning engine (MLE) 344 creates a classification ML/AI model based on the training data set (e.g., a binary classifier). It should be noted that different ML/AI models may be selected for each KPI and/or for each data source, e.g., where the selection may depend on the characteristics of the KPI and/or the DS.

Supervised learning models, e.g., based on logistic regression classification, support vector machine (SVM) classification, and so forth may be adopted for some KPIs, and deep-learning models, e.g., long short-term memory (LSTM)-based models, or the like, may be adopted for other KPIs. In one example, the machine learning engine (MLE) 344 may select a particular model by experimenting with multiple models and selecting a model with a highest accuracy. However, in another example, alternative or additional selection criteria (such as cost of licensing and/or use of a particular model, speed of processing, etc., may be applied). In one example, machine learning engine (MLE) 344 stores the selected ML/AI models (e.g., binary classifiers) in data pattern table 346. In one example, if no ML/AI model is found to meet the selection criteria for a KPI and/or for a DS, then a data source validity check is not supported for the DS (or for the DS with respect to at least one KPI; e.g., in one example, it is possible that other model(s) may be available for a validity check of the DS with respect to other KPI(s)).

Next, for the portion of the training data set of each DS (or each DS with respect to a specific KPI) that is labeled as faulty data patterns (FDPs), the machine learning engine (MLE) 344 may create a clustering model, e.g., K-means clustering model or the like, that meets specified requirements (e.g., accuracy, statistical robustness, etc.), and save the clustering model and/or the attributes of the model in data pattern table 346. In addition, from the portion of the training data set labeled as FDPs, machine learning engine (MLE) 344 may select a smaller set of samples which are to be used for clustering in Stage 2 (described below). For instance, machine learning engine (MLE) 344 may select these samples so as to fully represent the faulty data types, e.g., when the clustering model created in the previous step is applied to the selected sample data set, the attributes of the clusters (e.g., number of clusters, relative positions within a feature space (such as cluster centroid location), etc.), should remain the same as those of the clusters that are constructed based on the full FDP portion of the training data set. The selected FDP samples may also be saved into the data pattern table 346.

After machine learning engine (MLE) 344 saves the foregoing into data pattern table 346, machine learning engine (MLE) 344 is ready to check the input data from data source fault detector (DSFD) 343. For instance, in the example of FIG. 7, the flowchart 700 illustrates a three-stage workflow. The flowchart 700 begins at operation 701 with data source mediator (DSM) 342 requesting data source fault detector (DSFD) 343 to check a data source. At operation 702, data source fault detector (DSFD) 343 requests machine learning engine (MLE) 344 to check the data source. Next the flowchart 700 proceeds to operation 703 where Stage 1, binary classification for determining whether an input data pattern is consistent with known/labeled "correct data patterns" (CDPs) is applied. For instance, machine learning engine (MLE) 344 may receive the request from data source fault detector (DSFD) 343, retrieve the trained ML/AI model (e.g., a binary classifier) for the specified DS (and/or for the DS with respect to a particular KPI) in the request, and apply the model to the input data in the request for binary classification. If the input data is classified as CDP (e.g., "consistent" with known CDPs) as an output of the binary classifier, machine learning engine (MLE) 344 may return a status of [safe] to data source fault detector (DSFD) 343 at operation 705. At operation 720, data source fault detector (DSFD) 343 may forward the status determination to the data source mediator (DSM) 342. At operation 703, data source mediator (DSM) 342 may take actions depending upon the results (e.g., in accordance with one of the tables 510, 520, or 600 of FIGS. 5 and 6).

On the other hand, if the input data is not classified as "correct data pattern" (CDP) at operation 704 (for instance, the input data may be classified as "not consistent"), machine learning engine (MLE) 344 may proceed to Stage 2: clustering for identifying/confirming FDP Data, e.g., operation 706. To illustrate, machine learning engine (MLE) 344 may retrieve the stored FDP samples (the smaller, representative set) and the associated clustering model and attributes from data pattern table (346). Next, machine learning engine (MLE) 344 may combine the representative FDP samples with the input data from Stage 1 and apply the ML/AI clustering model, e.g., K-means clustering model, to (1) the original FDP sample set, and (2) the combined data set of the FDP sample set and the input data. Machine learning engine (MLE) 344 may then compare key attributes of the resultant clusters from the two data sets, e.g., a number of clusters (or one or more attributes comprising: a number of clusters, the positions of the clusters in a feature space, etc.). If the attributes of the resultant clusters are considered the same, e.g., the numbers of clusters are the same, the positions of the centroids are the same or close to the same (such as within a threshold distance), the input data may be determined to be a "faulty data pattern" (FDP) and classified as such. In other words, machine learning engine (MLE) 344 may return a status of [faulty] to data source fault detector (DSFD) 343 at operation 708.

Conversely, if attributes of the resultant clusters are considered different, e.g., the numbers of clusters are different, the positions of the centroids are not the same or are not within a threshold distance, etc., the input data may be considered as an unknown or unrecognized data pattern. In other words, machine learning engine (MLE) 344 may return a status of [warning] to data source fault detector (DSFD) 343 at operation 709. In addition, for an unknown or unrecognized data pattern, machine learning engine (MLE) 344 may enter Stage 3 at operation 710. For instance, operation 710 may comprise an optional step for examining and labeling an unknown data pattern by an expert, e.g., network personnel. For instance, network personnel may be notified of the unknown data pattern, thereby allowing the network personnel to examine the unknown or unrecognized data pattern and to label the data as "correct data pattern" (CDP) or "faulty data pattern" (FDP). At operation 711, machine learning engine (MLE) 344 may add the labeled data into the training data and update the ML/AI models (e.g., for either or both of Stage 1 and Stage 2 ML/AI models).

Returning to the example of FIG. 3, data source selection may operate in three modes: 1) reactive mode (open-loop applications) in which data source selector (DSS) 341 works with data source mediator (DSM) 342 and data source fault detector (DSFD) 343 in the runtime, 2) proactive mode (closed-loop applications) in which data source selector (DSS) 341 retrieves results directly from red-med table 345 for a given request, and in which data source mediator (DSM) 342 and data source fault detector (DSFD) 343 work in the background and update red-med table 345 periodically, and 3) hybrid mode, which may comprise a mix of the above two modes depend on the data request criteria, e.g., a latency requirement. For instance, for hybrid mode, if a request is not time sensitive, a runtime check may be applied. Otherwise, a current entry in red-med table 345 may be relied upon. To illustrate, the workflow of the proactive mode may comprise data source selector (DSS) 341 receiving a data request from a PI module in data processing layer 350 and querying for a primary data source (P-DS) from red-med table 345 for the performance indicator of the request. Optionally, data source selector (DSS) 341 may query for data from the selected primary data source and/or any secondary data source, tertiary data source, etc. In one example, a requesting PI module may indicate whether only a single data source is being requested or whether multiple data sources (e.g., secondary data source, etc.) should also be returned. The data source selector (DSS) 341 may forward at least the P-DS status ([safe], [warning], or [faulty]) and any other data sources (if requested) to the requesting performance indicator module; DSS 341 may also forward the data from the data source(s), if requested.

In the background, to keep red-med table 345 up to date a background update procedure may comprise data source mediator (DSM) 342 querying for the primary data source (P-DS) from red-med table 345 for each performance indicator of interest. Data source mediator (DSM) 342 may request data source selector (DSS) 341 to provide input data that may then be passed to data source fault detector (DSFD) 343 along with a request to check the validity of the primary data source. For instance, data source fault detector (DSFD) 343 may run a validity check via machine learning engine 344. Data source fault detector (DSFD) 343 may return the resulting status determination of the primary data source to data source mediator (DSM) 342. Data source mediator (DSM) 342 may update the red-med table 345 according to the returned results (e.g., per one of the action tables 510, 520, or 600). The background update procedure may be performed periodically based on the reporting granularity of data source and/or specific application requirements. For example, if a data source generates data every hour, the update procedure for the data source can be performed hourly; if a data processing module requests a performance indicator every day, the update procedure for the data source (and/or for the data source with respect to the particular performance indicator) can be performed daily. In addition, the machine learning engine (MLE) 344 may update the ML/AI models stored in data pattern table 346 on the same or a different schedule. Additionally, when a set of unknown data pattern(s) is labeled, e.g., by network personnel, the ML/AI models may also be updated to reflect the new, known data patterns.

In the reactive mode, data source selector (DSS) 341 may receive a data request from a data processing module (one of performance indicator modules 351-353) in data processing layer 350. Data source selector (DSS) 341 may request results from data source mediator (DSM) 342 for the performance indicator in the request. Data source mediator (DSM) 342 may retrieve the identification of the primary data source (P-DS), from red-med table 345 for the performance indicator in the request. Next, data source mediator (DSM) 342 may request data source selector (DSS) 341 to obtain and provide an input data set from the primary data source (P-DS) to be used for a validity check by data source fault detector (DSFD) 343. Thus, data source mediator (DSM) 342 may pass the input data set(s) to data source fault detector (DSFD) 343 with a request to check the primary data source. Data source fault detector (DSFD) 343 may then apply the input data set to the machine learning engine 344 and return the resulting status of the primary data source to the data source mediator (DSM) 342. If the primary data source is [safe], data source mediator (DSM) 342 may return the identification of the primary data source and an indication of the status to data source selector (DSS) 341. However, if the primary data source is [faulty] or [warning], data source mediator (DSM) 342 may update red-med table 345 (e.g., per one of the action tables 510, 520, or 600).

Optionally, data source selector (DSS) 341 may obtain data from the identified primary data source. Data source selector (DSS) 341 forwards the identification of the primary data source and an indicator of the status to the requesting data processing module from data processing layer 350. In one example, data source selector (DSS) 341 also forwards the data from the data source, if requested by the requesting data processing module and obtained by DSS 341. It should again be noted that the hybrid mode is a mixed use of both the proactive mode and reactive mode. In one example, data source selector (DSS) 341 can decide to retrieve an identification of a primary data source from the red-med table 345 or data source mediator (DSM) 342, depending on request criteria, e.g., a latency requirement, etc.

Figure 8:
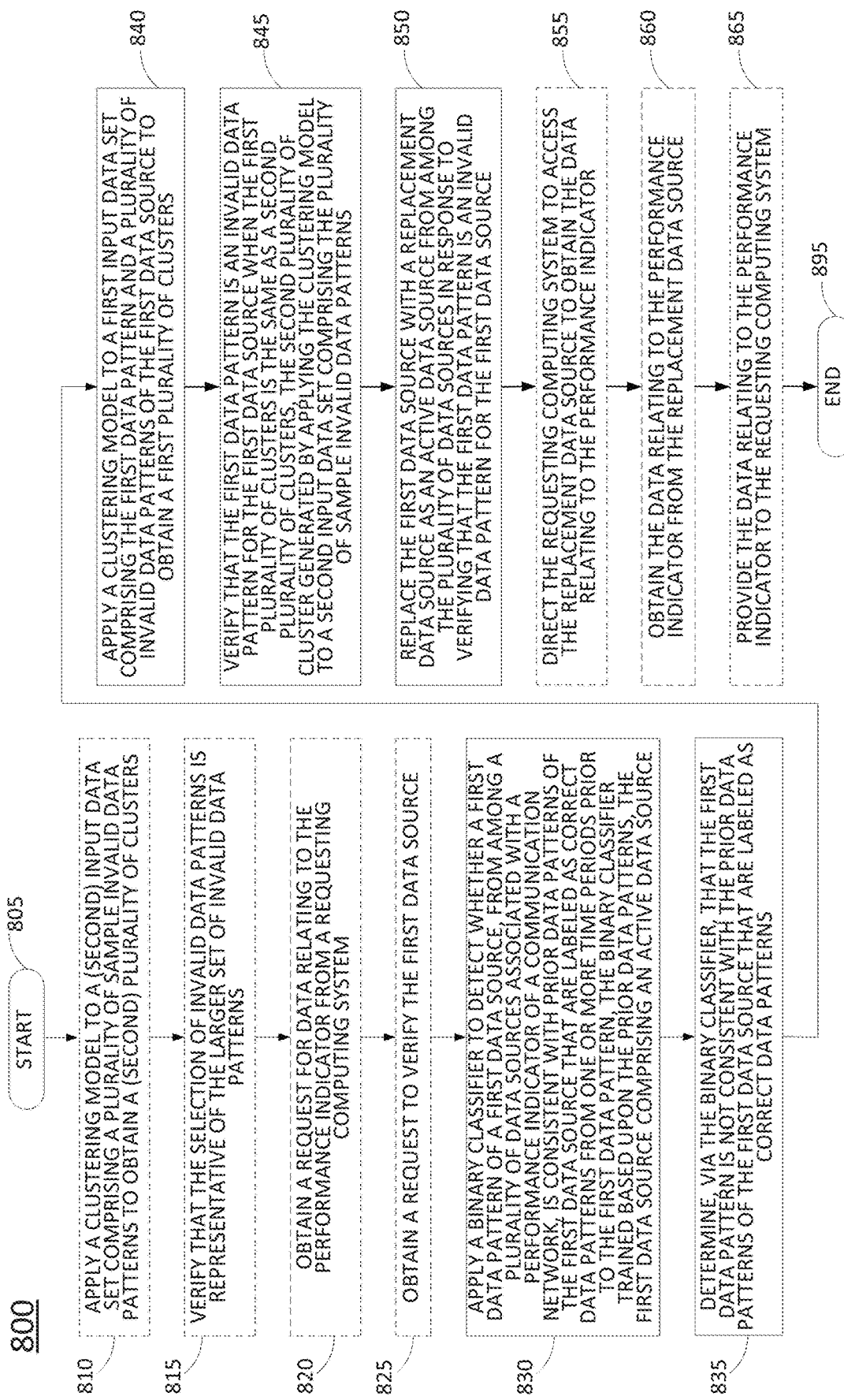
FIG. 8 illustrates a flowchart of an example method for replacing a first data source with a replacement data source as an active data source for communication network monitoring in response to verifying an invalid data pattern of the first data source.

FIG. 8 illustrates a flowchart of an example method 800 for replacing a first data source with a replacement data source as an active data source for communication network monitoring in response to verifying an invalid data pattern of the first data source, in accordance with the present disclosure. In one example, the method 800 is performed by a processing system (such as data source management system 190 of FIG. 1; similarly, data source management system 340 of FIG. 3) or by one or more components thereof, (e.g., a processor, or processors, performing operations stored in and loaded from a memory), or by a data source management system in conjunction with other components such as routers, switches, firewalls, or other first-level sampling components, collector(s), an SON orchestrator and/or SDN controller, data sources, such as data storage and archiving systems 198, performance indicator modules 353/data processing modules 192, etc. In one example, the steps, functions, or operations of method 800 may be performed by a computing device or system 900, and/or processor 902 as described in connection with FIG. 9 below. For instance, the computing device or system 900 may represent any one or more components of the system 100, the architecture 300, etc. that is/are configured to perform the steps, functions and/or operations of the method 800. Similarly, in one example, the steps, functions, or operations of method 800 may be performed by a processing system comprising one or more computing devices collectively configured to perform various steps, functions, and/or operations of the method 800. For instance, multiple instances of the computing device or processing system 900 may collectively function as a processing system. For illustrative purposes, the method 800 is described in greater detail below in connection with an example performed by a processing system. The method 800 begins in step 805 and may proceed to one of the optional steps 810, 820, or 825, or to step 830.

At optional step 810, the processing system may apply a clustering model, e.g., a clustering algorithm, to a (second) input data set comprising a plurality of sample invalid data patterns to obtain a (second) plurality of clusters. In one example, the plurality of sample invalid data patterns comprises a selection of invalid data patterns from among a larger set of invalid data patterns for a first data source from among a plurality of data sources associated with a performance indicator (e.g., associated with at least one component or aspect of a communication network).

It should also be noted that although the terms, "first," "second," "third," etc., are used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated.

At optional step 815, the processing system may verify that the selection of invalid data patterns is representative of the larger set of invalid data patterns. In one example, the verifying comprises determining that the (second) plurality of clusters is the same as a (third) plurality of clusters. For instance, the (third) plurality of clusters may be obtained by applying the clustering model to the larger set of invalid data patterns.

At optional step 820, the processing system may obtain a request for data relating to the performance indicator from a requesting computing system. For instance, the requesting computing system may comprise one of the performance indicator modules/data processing modules, e.g., of a data processing layer, or may comprise a consuming application or service, such as SON/SDN controller, a network monitoring and alerting system, one or more user devices of network personnel, etc.

At optional step 825, the processing system may obtain a request to verify the first data source. In one example, the request to verify the first data source is associated with a request for data relating to the performance indicator (e.g., that may be obtained at optional step 820). For instance, the processing system may operate in the "reactive" or "hybrid" modes described above. For instance, the processing system may comprise a data source fault detector (DSFD), and the request to verify the first data source may be received from a data source mediator (DSM) and/or a data source selector (DSS), such as illustrated in FIG. 3. However, it should be noted that in another example, the processing system performing the method 800 may comprise all of the example components of a data source management system as described herein.

At step 830, the processing system applies a binary classifier to detect whether a first data pattern of the first data source is consistent with prior data patterns of the first data source that are labeled as correct data patterns from one or more time periods prior to the first data pattern. For instance, in one example, the binary classifier is trained based upon the prior data patterns, e.g., to generate an output comprising a determination of whether an input data pattern either is or is not consistent with the prior data patterns. In one example, the first data source may comprise one of a plurality of data sources associated with the performance indicator of the communication network. In addition, in one example, the first data source may comprise an active data source. For instance, the plurality of data sources associated with the performance indicator may comprise a primary data source, that is an active data source, and at least a secondary data source. In one example, the secondary data source may also be an active data source. In one example, the first data source comprises the primary data source, or one of the at least the secondary data source. In one example, the plurality of data sources associated with the performance indicator further comprises at least one standby/non-active data source (e.g., a "wait list" data source).

At step 835, the processing system determines, via the binary classifier, that the first data pattern is not consistent with the prior data patterns of the first data source that are labeled as correct data patterns. In other words, the output of the binary classifier may be a classification of the first data pattern as "not consistent" (e.g., anomalous). In one example, steps 830 and 835 may comprise the same or similar operations as described in connection with Stage 1 of the flowchart 700 of FIG. 7.

At step 840, the processing system applies a clustering model, e.g., a clustering algorithm, to a first input data set comprising a combination of: (1) the first data pattern and (2) a plurality of invalid data patterns of the first data source, in order to obtain a first plurality of clusters. In one example, step 840 may be commenced in response to determining that the first data pattern is "not consistent" at step 835.

At step 845, the processing system verifies that the first data pattern is an invalid data pattern for the first data source when the first plurality of clusters is the same as a second plurality of clusters. For instance, the second plurality of clusters may be generated by applying the clustering model to a second input data set comprising the plurality of sample invalid data patterns. For example, the second plurality of clusters may be generated per optional step 810 above. In one example, steps 840 and 845 may comprise the same or similar operations as described in connection with Stage 2 of the flowchart 700 of FIG. 7.

At step 850, the processing system replaces the first data source with a replacement data source as an active data source from among the plurality of data sources in response to verifying that the first data pattern is an invalid data pattern for the first data source (e.g., when such a replacement data source is available). For instance, step 850 may comprise an operation, or operations, in accordance with action table 520 of FIG. 5 or action table 600 of FIG. 6.

At optional step 855, the processing system may direct the requesting computing system to access the replacement data source to obtain the data relating to the performance indicator. For instance, in an example in which steps 830-850 are performed in response to a request obtained at optional step 820 from a requesting computing system, the processing system may identify the replacement data source as a primary data source (or other active data source, such as a secondary data source that is also "active") from which the requesting computing system may access the data associated with the performance indicator.

At optional step 860, the processing system may obtain the data relating to the performance indicator from the replacement data source. For instance, in one example, the request from the requesting computing system may specify that the processing system should obtain and provide the data relating to the performance indicator, e.g., rather than directing the requesting computing system to the appropriate data source(s). However, in another example, the request to provide the data may be implied in the request obtained at optional step 820.

At optional step 865, the processing system may provide the data relating to the performance indicator to the requesting computing system. In particular, optional step 865 may be performed following and in conjunction with optional step 860.

Following step 850, or one of the optional steps 855 or 865, the method 800 proceeds to step 895 where the method 800 ends.

It should be noted any of the example method 800 may be expanded to include additional steps, or may be modified to replace steps with different steps, to combine steps, to omit steps, to perform steps in a different order, and so forth. For instance, in one example the processing system may repeat one or more steps of the method 800, such as steps 830-850 for additional data sources with respect to the same or a different performance indicator, step 830 with respect to different data sources (e.g., where these data sources are determined to have "consistent" or "correct" data patterns and subsequent steps of the method 800 are not reached), and so forth. For instance, the method 800 may be applied to verify the data integrity of all available data sources with respect to the performance indicator, active data sources with respect to the performance indicator, and/or at least those that are not already determined to be faulty. In one example, the method 800 may further include training the binary classifier. Alternatively, or in addition, the method 800 may further include retraining the binary classifier, retraining the clustering model and/or applying the clustering model to an updated training data set to determine an updated set of cluster information, and so forth. In one example, the method 800 may include determining unknown data patterns for one or more data sources, obtaining labels for the unknown data patterns, e.g., from network personnel, and retraining the model(s) based upon the newly labeled data pattern(s). In one example, the method 800 may be modified to include presenting a warning on the validity of the first data source following step 845 (e.g., at step 850, or as an alternative to step 850 when a replacement data source is not available). For instance, the first data source may be allowed to continue as an active data source, but with the warning being provided along with the data of the first data source to any entities obtaining such data.

In one example, the method 800 may include further confirming that the first data pattern of the first data source is not a valid data pattern by comparing the first data pattern to one or more additional data patterns from secondary data sources regarding the performance indicator. For instance, when there is congruence between the first data pattern and the one or more additional data patterns, this may be indicative that the first data pattern is not invalid, but that there is network event that is causing the first data pattern to appear anomalous. In other words, such additional operation(s) may distinguish between a problem with the first data source (such as an operating system update by a device vendor causing a change in the data format that was not accounted for, e.g., a change from 5 minute records to 2 minute records, or the like) versus correct data that is anomalous due to a network event, such as a major power outage, a widespread Domain Name System (DNS) failure, etc. In still another example, the machine learning-based verification of step 830 and subsequent steps may be initiated in response to first comparing data patterns from the first data source and one or more secondary data sources and determining that the data patterns do not match.

In one example, the processing system may comprise one or more performance indicator modules/data processing modules, e.g., of a data processing layer. In such an example, the method 800 may further include calculating the performance indicator based upon the data from the replacement data source. In one example, the processing system may further comprise an SON/SDN controller. In such an example, the method 800 may further include adjusting at least one aspect of the network based upon the performance indicator, such as re-routing at least a portion of the traffic in a selected portion of the network, load-balancing at least a portion of the traffic in the selected portion of the network, offloading at least a portion of the traffic in the selected portion of the network, applying a denial-of-service mitigation measure in the selected portion of the network, and so forth. In each example, the adjusting may include allocating at least one additional resource of the network based upon the performance indicator and/or removing at least one existing resource of the communication network based upon the performance indicator. In one example, the processing system may reconfigure at least one allocated resource of the communication network differently based upon the performance indicator that is determined, i.e., without having to allocate a new resource of the communication network. An additional resource that may be added or an existing resource that may be removed (e.g., deactivated and/or deallocated) may be a hardware component of the network, or may be provided by hardware, e.g., bandwidth on a link, line card, router, switch, or other processing node, a CDN storage resource, a VM and/or a VNF, etc. Thus, these and other modifications are all contemplated within the scope of the present disclosure.

In addition, although not expressly specified above, one or more steps of the method 800 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 8 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 9 depicts a high-level block diagram of a computing system 900 (e.g., a computing device, or processing system) specifically programmed to perform the functions described herein. For example, any one or more components or devices illustrated in FIGS. 1-3 or discussed in connection with the examples of FIGS. 4-8 may be implemented as the computing system 900. As depicted in FIG. 9, the computing system 900 comprises a hardware processor element 902 (e.g., comprising one or more hardware processors, which may include one or more microprocessor(s), one or more central processing units (CPUs), and/or the like, where hardware processor element may also represent one example of a "processing system" as referred to herein), a memory 904, (e.g., random access memory (RAM), read only memory (ROM), a disk drive, an optical drive, a magnetic drive, and/or a Universal Serial Bus (USB) drive), a module 905 for replacing a first data source with a replacement data source as an active data source for communication network monitoring in response to verifying an invalid data pattern of the first data source, and various input/output devices 906, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 902 is shown, it should be noted that the computing device may employ a plurality of hardware processor elements. Furthermore, although only one computing device is shown in FIG. 9, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 9 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 902 can also be configured or programmed to cause other devices to perform one or more operations as discussed above. In other words, the hardware processor element 902 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 905 for replacing a first data source with a replacement data source as an active data source for communication network monitoring in response to verifying an invalid data pattern of the first data source (e.g., a software program comprising computer-executable instructions) can be loaded into memory 904 and executed by hardware processor element 902 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 905 for replacing a first data source with a replacement data source as an active data source for communication network monitoring in response to verifying an invalid data pattern of the first data source (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
 applying, by a processing system comprising at least one processor, a binary classifier to detect whether a first data pattern of a first data source, from among a plurality of data sources associated with a performance indicator of a communication network, is consistent with prior data patterns of the first data source that are labeled as correct data patterns from one or more time periods prior to the first data pattern, wherein the binary classifier is trained based upon the prior data patterns, wherein the first data source comprises an active data source;
 determining, by the processing system via the binary classifier, that the first data pattern is not consistent with the prior data patterns of the first data source that are labeled as correct data patterns;
 applying, by the processing system, a clustering model to a first input data set comprising the first data pattern and a plurality of invalid data patterns of the first data source to obtain a first plurality of clusters;
 verifying, by the processing system, that the first data pattern is an invalid data pattern for the first data source when the first plurality of clusters is the same as a second plurality of clusters, the second plurality of clusters generated by applying the clustering model to a second input data set comprising the plurality of invalid data patterns; and replacing, by the processing system, the first data source with a replacement data source as an active data source from among the plurality of data sources in response to the verifying that the first data pattern is an invalid data pattern for the first data source.

2. The method of claim 1, further comprising:
obtaining a request to verify the first data source.

3. The method of claim 2, wherein the request to verify the first data source is associated with a request for data relating to the performance indicator.

4. The method of claim 1, further comprising:
obtaining a request for data relating to the performance indicator from a requesting computing system.

5. The method of claim 4, further comprising:
directing the requesting computing system to access the replacement data source to obtain the data relating to the performance indicator.

6. The method of claim 4, further comprising:
obtaining the data relating to the performance indicator from the replacement data source; and
providing the data relating to the performance indicator to the requesting computing system.

7. The method of claim 1, wherein the plurality of data sources associated with the performance indicator comprises a primary data source and at least a secondary data source as active data sources.

8. The method of claim 7, wherein the first data source comprises:
the primary data source; or
one of the at least the secondary data source.

9. The method of claim 7, wherein the plurality of data sources associated with the performance indicator further comprises at least one standby non-active data source.

10. The method of claim 1, further comprising:
applying the clustering model to the second input data set comprising the plurality of invalid data patterns to obtain the second plurality of clusters.

11. The method of claim 10, wherein the plurality of invalid data patterns comprises a selection of invalid data patterns from among a larger set of invalid data patterns for the first data source.

12. The method of claim 11, further comprising:
verifying that the selection of invalid data patterns is representative of the larger set of invalid data patterns.

13. The method of claim 12, wherein the verifying that the selection of invalid data patterns is representative of the larger set of invalid data patterns comprises determining that the second plurality of clusters is the same as a third plurality of clusters, wherein the third plurality of clusters is obtained by applying the clustering model to the larger set of invalid data patterns.

14. A non-transitory computer-readable medium storing instructions which, when executed by a processing system including at least one processor, cause the processing system to perform operations, the operations comprising:
applying a binary classifier to detect whether a first data pattern of a first data source, from among a plurality of data sources associated with a performance indicator of a communication network, is consistent with prior data patterns of the first data source that are labeled as correct data patterns from one or more time periods prior to the first data pattern, wherein the binary classifier is trained based upon the prior data patterns, wherein the first data source comprises an active data source;

determining, via the binary classifier, that the first data pattern is not consistent with the prior data patterns of the first data source that are labeled as correct data patterns;

applying a clustering model to a first input data set comprising the first data pattern and a plurality of invalid data patterns of the first data source to obtain a first plurality of clusters;

verifying that the first data pattern is an invalid data pattern for the first data source when the first plurality of clusters is the same as a second plurality of clusters, the second plurality of clusters generated by applying the clustering model to a second input data set comprising the plurality of invalid data patterns; and replacing the first data source with a replacement data source as an active data source from among the plurality of data sources in response to the verifying that the first data pattern is an invalid data pattern for the first data source.

15. The non-transitory computer-readable medium of claim 14, the operations further comprising:
obtaining a request to verify the first data source.

16. The non-transitory computer-readable medium of claim 15, wherein the request to verify the first data source is associated with a request for data relating to the performance indicator.

17. The non-transitory computer-readable medium of claim 14, the operations further comprising:
obtaining a request for data relating to the performance indicator from a requesting computing system.

18. The non-transitory computer-readable medium of claim 17, the operations further comprising:
directing the requesting computing system to access the replacement data source to obtain the data relating to the performance indicator.

19. The non-transitory computer-readable medium of claim 17, the operations further comprising:
obtaining the data relating to the performance indicator from the replacement data source; and
providing the data relating to the performance indicator to the requesting computing system.

20. An apparatus comprising:
a processing system including at least one processor; and
a computer-readable medium storing instructions which, when executed by the processing system, cause the processing system to perform operations, the operations comprising:
applying a binary classifier to detect whether a first data pattern of a first data source, from among a plurality of data sources associated with a performance indicator of a communication network, is consistent with prior data patterns of the first data source that are labeled as correct data patterns from one or more time periods prior to the first data pattern, wherein the binary classifier is trained based upon the prior data patterns, wherein the first data source comprises an active data source;

determining, via the binary classifier, that the first data pattern is not consistent with the prior data patterns of the first data source that are labeled as correct data patterns;

applying a clustering model to a first input data set comprising the first data pattern and a plurality of invalid data patterns of the first data source to obtain a first plurality of clusters;

verifying that the first data pattern is an invalid data pattern for the first data source when the first plurality of clusters is the same as a second plurality of clusters, the second plurality of clusters generated by applying the clustering model to a second input data set comprising the plurality of invalid data patterns; and replacing the first data source with a replacement data source as an active data source from among the plurality of data sources in response to the verifying that the first data pattern is an invalid data pattern for the first data source.

* * * * *